United States Patent
Roscoe

(10) Patent No.: US 10,185,053 B2
(45) Date of Patent: Jan. 22, 2019

(54) RADIATION GENERATOR AND POWER SUPPLY CONFIGURATION FOR WELL LOGGING INSTRUMENTS

(71) Applicant: Schlumberger Technology Corporation, Sugar Land, TX (US)

(72) Inventor: Bradley A. Roscoe, West Chesterfield, NH (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 166 days.

(21) Appl. No.: 15/206,561

(22) Filed: Jul. 11, 2016

(65) Prior Publication Data

US 2016/0320522 A1    Nov. 3, 2016

Related U.S. Application Data

(63) Continuation of application No. 12/672,425, filed on Apr. 11, 2011, now Pat. No. 9,389,333.

(60) Provisional application No. 60/954,586, filed on Aug. 8, 2007.

(51) Int. Cl.
*G01V 5/04*    (2006.01)
*G01V 5/10*    (2006.01)

(52) U.S. Cl.
CPC ................ *G01V 5/105* (2013.01); *G01V 5/04* (2013.01); *G01V 5/10* (2013.01); *G01V 5/104* (2013.01)

(58) Field of Classification Search
None
See application file for complete search history.

(56) References Cited

U.S. PATENT DOCUMENTS

| 2,659,011 A | * | 11/1953 | Youmans | G01T 1/40 |
| | | | | 250/214 C |
| 3,255,353 A | | 6/1966 | Scherbatskoy | |
| 3,258,593 A | * | 6/1966 | Reed et al. | G01V 5/101 |
| | | | | 165/902 |
| 3,461,291 A | | 8/1969 | Goodman | |
| 3,980,881 A | | 9/1976 | Veach et al. | |
| 4,390,783 A | | 6/1983 | Grau | |
| 4,501,964 A | | 2/1985 | Arnold | |
| 4,507,554 A | | 3/1985 | Hertzog et al. | |
| RE32,070 E | | 1/1986 | Vezin | |
| 4,596,926 A | | 6/1986 | Coope | |
| 4,698,501 A | | 10/1987 | Paske | |

(Continued)

FOREIGN PATENT DOCUMENTS

RU    2249836 C1    4/2005

OTHER PUBLICATIONS

Communication pursuant to Article 94(3)EPC for EP application No. EP08797237.8, Feb. 24, 2015, 3 pages.

(Continued)

*Primary Examiner* — Yara B Green
(74) *Attorney, Agent, or Firm* — Michael Dae

(57) ABSTRACT

A well logging instrument includes a radiation generator and a high voltage power supply functionally coupled to the generator. The generator and the supply are longitudinally separated by a distance sufficient for emplacement of a radiation detector. At least a first radiation detector is disposed in a space between the generator and the supply. The instrument includes an electrical connection between the supply and the generator.

20 Claims, 5 Drawing Sheets

(56) References Cited

U.S. PATENT DOCUMENTS

| | | |
|---|---|---|
| 4,705,944 A | 11/1987 | Coope |
| 4,810,459 A | 3/1989 | Fontenot |
| 4,829,176 A | 5/1989 | Paske et al. |
| 4,879,463 A | 11/1989 | Wraight et al. |
| 4,883,956 A | 11/1989 | Melcher et al. |
| 4,904,865 A | 2/1990 | Meisner et al. |
| 4,926,044 A | 5/1990 | Wraight |
| 4,937,446 A | 6/1990 | McKeon et al. |
| 4,972,082 A | 11/1990 | Loomis et al. |
| 5,012,091 A | 4/1991 | Moake |
| 5,021,653 A | 6/1991 | Roscoe et al. |
| 5,049,743 A | 9/1991 | Taylor, III et al. |
| 5,081,351 A | 1/1992 | Roscoe et al. |
| 5,097,123 A | 3/1992 | Grau et al. |
| 5,105,080 A | 4/1992 | Stoller et al. |
| 5,182,051 A | 1/1993 | Bandy et al. |
| 5,219,518 A | 6/1993 | Roscoe et al. |
| 5,235,185 A | 8/1993 | Albats et al. |
| 5,237,594 A | 8/1993 | Carroll |
| 5,243,190 A | 9/1993 | Brandy et al. |
| 5,434,408 A | 7/1995 | Smith, Jr. et al. |
| 5,521,378 A | 5/1996 | Roscoe et al. |
| 5,539,225 A | 7/1996 | Loomis et al. |
| 5,608,215 A | 3/1997 | Evans |
| 5,804,820 A | 9/1998 | Schlumberger |
| 5,825,024 A * | 10/1998 | Badruzzaman ........ G01V 5/125 250/269.6 |
| 5,929,437 A | 7/1999 | Elliott et al. |
| 7,000,692 B2 | 2/2006 | Hosie et al. |
| 7,148,471 B2 | 12/2006 | Roscoe et al. |
| 2002/0170348 A1 * | 11/2002 | Roscoe .................. G01V 5/101 73/152.02 |
| 2004/0221987 A1 | 11/2004 | Snoga |
| 2007/0188344 A1 | 8/2007 | Hache et al. |

OTHER PUBLICATIONS

Decision on Grant for Russian Application No. 2010108287128(011660) dated Nov. 2, 2012.
S. Bonner et al., "A New Generation of Electrode Resistivity Measurements for Formation Evaluation while Drilling," SPWLA 35th Annual Logging Symposium, Paper OO (Jun. 19-22, 1994).

* cited by examiner

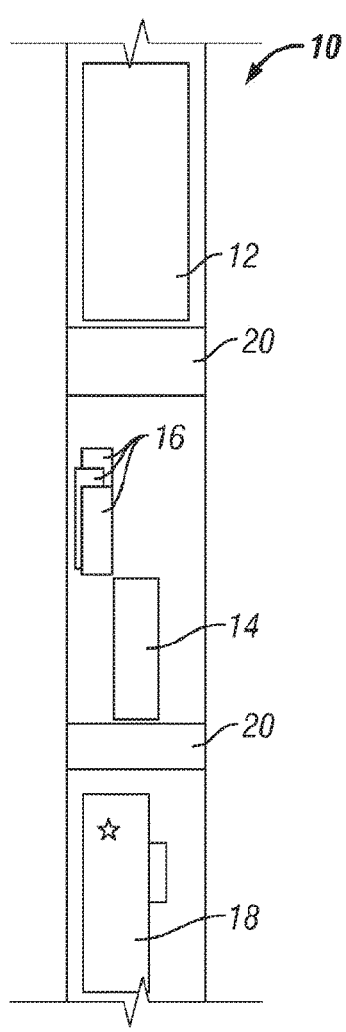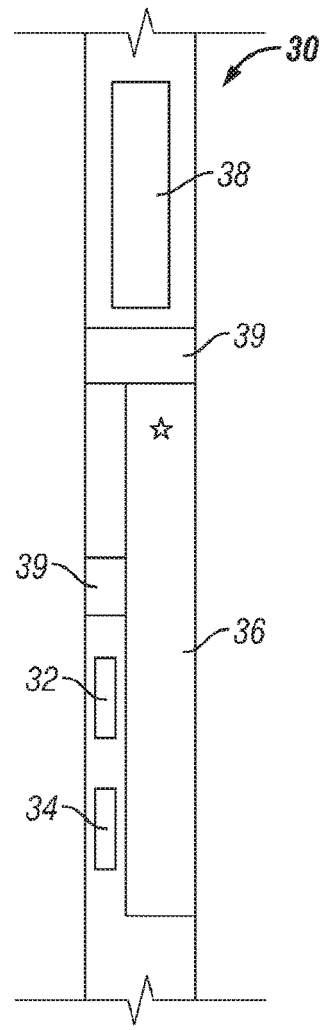
FIG. 1
(Prior Art)
FIG. 2
(Prior Art)

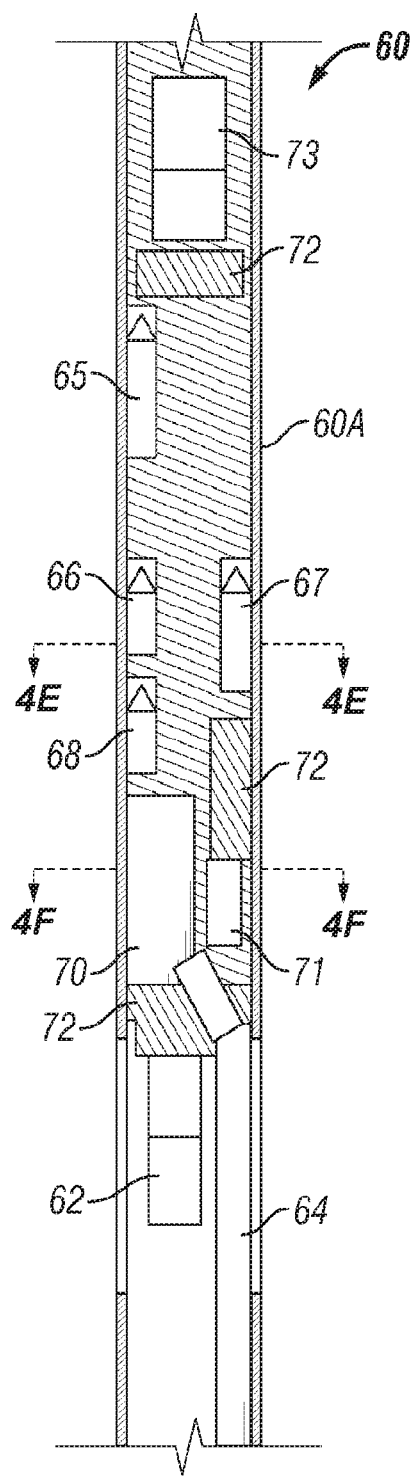
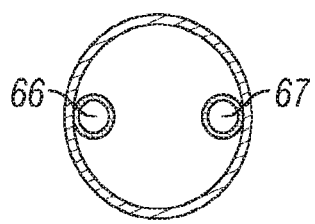
FIG. 4E
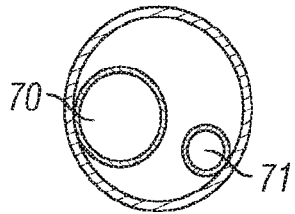
FIG. 4F
FIG. 4

RADIATION GENERATOR AND POWER SUPPLY CONFIGURATION FOR WELL LOGGING INSTRUMENTS

CROSS-REFERENCE TO RELATED APPLICATIONS

This is a continuation application of U.S. application Ser. No. 12/672,425 filed on Aug. 6, 2008 and published on Oct. 25, 2012 as US2012/0267520, which in turn claims the benefit of U.S. Provisional Application No. 60/954,586 filed on Aug. 8, 2007. The contents of both applications are hereby incorporated by reference in their entireties.

STATEMENT REGARDING FEDERALLY SPONSORED RESEARCH OR DEVELOPMENT

Not applicable.

BACKGROUND OF THE INVENTION

Field of the Invention

The invention relates generally to the field of neutron generator-type well logging instruments. More specifically, the invention relates to structures for high voltage power supplies used with neutron generator-type well logging instruments to enable better placement of internal components of such instruments.

Background Art

The characteristics of geological formations are of significant interest in the exploration for, production and monitoring of subsurface water and mineral deposits, such as oil and gas. To that end, a variety of techniques have been developed to measure subsurface characteristics and evaluate the characteristics to determine certain petrophysical properties of interest. These techniques typically include the subsurface deployment of tools or instruments having energy sources to emit energy into the formations (usually from within a borehole traversing the formations). The emitted energy interacts with the surrounding formations to produce signals that are detected and measured by one or more sensors on the instrument. By processing the detected signal data, a profile or log of the subsurface properties is obtained.

A variety of logging techniques have been developed to evaluate subsurface formations. A number of such techniques include emitting neutrons into the formation and evaluating the results of neutron interactions with formation nuclei. Various types of radiation sources have been used in subsurface well logging systems. For example, neutrons or gamma rays may be generated simply through the use of radioactive isotopes (which naturally decay over time), an x-ray source may be used or neutrons may be generated in an electronic device utilizing a nuclear fusion reaction to generate neutrons on demand. In such electronic neutron sources, high-energy neutrons may be generated through the controlled collision of energized particles by using a nuclear fusion reaction caused by accelerating ions toward a target at high voltage, so as to emit neutrons in bursts of fully controllable lengths and time sequences. Such devices may be referred to for convenience as neutron generators to distinguish them from chemical isotope sources. One neutron generator (referred to as a "pulsed" neutron generator) is described in U.S. Pat. No. 3,461,291. The neutron source described in the '291 patent uses an accelerator tube in which charged particles, such as deuterium ions, are accelerated across a high voltage potential and contact a target element such as tritium. The reaction between the deuterium ions with the tritium target produces substantially monoenergetic bursts of neutrons at an energy level of about 14 million electron volts (MeV). In most well logging applications the neutrons are not emitted continuously but in short bursts of well-defined lengths and sequence of repetition, however continuous generation of neutrons is also possible. When using such a neutron generator, the formation surrounding the instrument is typically subjected to repeated, discrete "bursts" of high energy neutrons. U.S. Pat. Nos. 4,501,964, 4,883,956, 4,926,044, 4,937,446, 4,972,082, 5,434,408, 5,105,080, 5,235,185, 5,539,225, and 5,608,215, for example, describe well logging instruments equipped with pulsed neutron generators.

In well logging using a neutron generator, the borehole and surrounding formation are irradiated with neutrons, and the various interactions of the neutrons with constituent nuclei are measured. Pulsed neutron well logging instruments typically include one or more sensors or detectors that record numbers of neutrons, particularly epithermal energy and thermal energy, as well as gamma rays which are emitted as a result of the interaction of the neutrons with the subsurface formations and the fluids in the borehole itself. The gamma rays may include inelastic gamma rays which are a consequence of high-energy collisions of the neutrons with atomic nuclei in the subsurface formations, as well as capture gamma rays emitted when low energy (thermal) neutrons are captured by susceptible atomic nuclei in the formations (for example, chlorine). Various relevant well logging techniques and tools are described, for example, in U.S. Pat. No. 4,390,783 to Grau, U.S. Pat. No. 4,507,554 to Hertzog et al., U.S. Pat. No. 5,021,653 to Roscoe et al., U.S. Pat. No. 5,081,351 to Roscoe et al., U.S. Pat. No. 5,097,123 to Grau et al., U.S. Pat. No. 5,237,594 to Carroll, and U.S. Pat. No. 5,521,378 to Roscoe et al.

Properties of the formations which may be determined as a result of measuring neutron and gamma ray phenomena include, for example, formation density, fractional volume of void or pore space in the formation (porosity), carbon/oxygen (C/O) ratios, formation lithology, and neutron capture cross section (Sigma), among other measurements. Properties which may be determined by spectral analysis of the gamma rays include concentration of various chemical elements, for example. Properties of fluids in the wellbore may also be determined from various neutron and gamma ray measurements.

Nuclear measurements are also useable in nuclear spectroscopy techniques to obtain qualitative and quantitative information related to subsurface fluid movement. U.S. Pat. No. 5,219,518 describes an instrument equipped with a neutron source and sensors adapted to measure water flow through neutron oxygen activation. Alternative techniques for subsurface fluid measurements include the use of radioactive markers or tracers to identify flow path between formations or wells. U.S. Pat. Nos. 5,049,743, 5,182,051, 5,243,190, and 5,929,437 describe the use of elements that can be made radioactive by bombardment with neutrons so their location can be determined by nuclear logging. Logging tools equipped with gamma ray detectors are particularly suited to distinguish and determine the location of trace materials.

The nuclear phenomena detected with the foregoing instruments are representative of interactions not only with the formation nuclei, but also with the instrument and the borehole. In order to penetrate the formation, the high energy neutrons must pass through the fluid in the borehole (and casing in some applications) before entering the formation. The resulting non-formation contributions to the measured radiations significantly complicate the analysis of the formation characteristics. The problem is all the more complex since the sensitivity of the detector(s) to the radiations coming from the borehole, instrument and the formation, is a function of many parameters, such as, to name a few, lithology, porosity, borehole size, casing size/weight/eccentricity, cement quality, detector housings, or borehole fluid composition. In practice, several techniques have been devised to account for these contributions and to discriminate the undesired radiations from the desired radiations.

For certain types of neutron measurements, the neutron generator and its associated high voltage power supply may be disposed in an instrument housing along with neutron detectors, a neutron monitor detector, gamma ray detectors, or some combinations of the foregoing. Neutron generator well logging instruments known in the art include a high voltage power supply to operate the neutron generator disposed adjacent to the neutron generator. Certain of the foregoing detectors may need to be in nearly identical longitudinal positions as the neutron generator within the instrument in order to optimize the measurements made by the such detectors. Such optimal detector placement is impracticable using conventional instrument configurations where the neutron generator and its associated high voltage power supply are disposed proximate each other. FIG. 1 illustrates such conventional instrument configuration. The instrument 10 includes a spectroscopy detector 12 operable for gamma ray detection, neutron detectors at different longitudinal positions, e.g., near 14 and far/array 16, a pulsed neutron generator 18, and appropriate shielding 20.

FIG. 2 illustrates another known instrument configuration. The instrument 30 is configured in what is called the "split-physics design", in which smaller diameter detectors 32, 34 can be disposed longitudinally alongside the neutron generator 36. Larger detectors 38, such as the gamma-ray detector referred to above, can be longitudinally displaced from the neutron generator 36 so that the combination of detectors can be better optimized. Appropriate shielding 39 is also included in the instrument. The instrument shown in FIG. 2 is described, for example, in U.S. Pat. No. 7,148,471 assigned to the assignee of the present invention. Limitations inherent in the configuration of FIG. 2 includes that the size of the detectors 32, 34 near the neutron generator 36 must be relatively small, and/or the diameter of the instrument housing must be relatively large. The foregoing may limit the optimum placement of detectors that are typically larger in diameter, for example, spectral gamma ray detector, or may require the use of instrument housings of such size as to require the use of the instrument only in larger diameter wellbores.

The foregoing statements related to neutron well logging instruments may also apply to well logging instruments having x-ray generators therein.

A need exists for improved radiation generator and detector configuration within a well logging instrument.

SUMMARY OF THE INVENTION

A well logging instrument according to one aspect of the invention includes a radiation generator and a high voltage power supply functionally coupled to the generator. The radiation generator and the supply are longitudinally separated by a distance sufficient for emplacement of a radiation detector. At least a first radiation detector is disposed in a space between the radiation generator and the power supply. The instrument includes an electrical connection between the supply and the radiation generator.

A method for evaluating formations traversed by a borehole according to another aspect of the invention includes generating electrical power to operate a radiation generator at a position longitudinally separated from a position of the neutron generator along the borehole. The longitudinal separation is sufficient to emplace a radiation detector. The electrical power is conducted to the radiation generator. The generator is operated to emit radiation into the formations. Radiation is detected at a longitudinal position between the position of the generating electrical power and the position of the radiation generator.

Other aspects and advantages of the invention will be apparent from the following description and the appended claims.

BRIEF DESCRIPTION OF THE DRAWINGS

FIG. 1 shows a prior art neutron generator well logging instrument.

FIG. 2 shows another prior art neutron generator well logging instrument.

FIG. 4 shows another example well logging instrument according to the invention.

FIGS. 4E and 4F show cross sections of the instrument of FIG. 4 at selected longitudinal positions.

DETAILED DESCRIPTION

Figure 3:
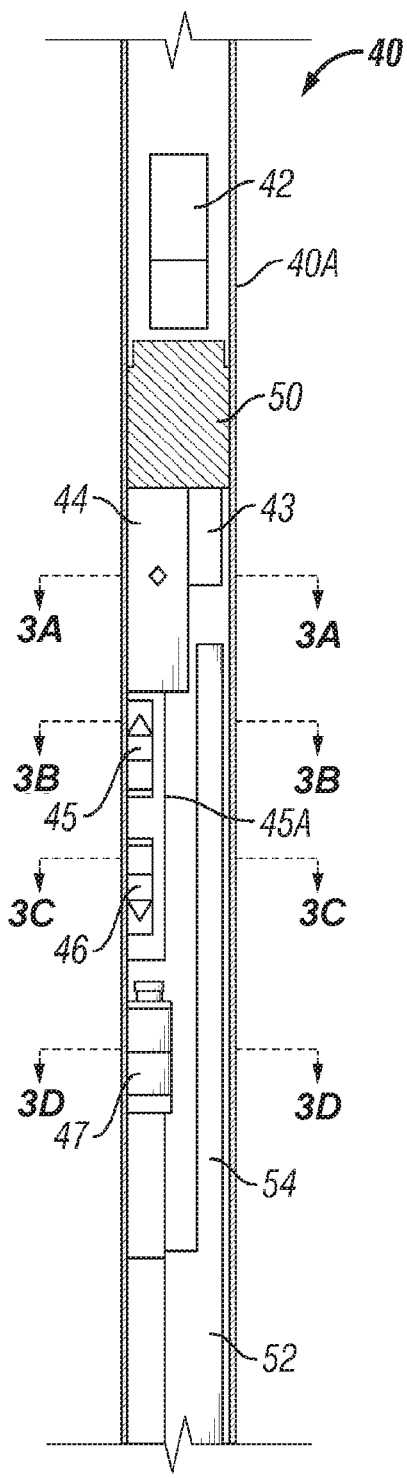
FIG. 3 shows one example of a radiation generator well logging instrument according to the invention.

FIG. 3 shows one example of a well logging instrument according to the invention. A well logging instrument 40 includes an elongated housing 40A having therein a gamma ray detector 42, which may be a scintillation crystal coupled to a photomultiplier and an associated multichannel pulse height analyzer for determining energy level of gamma rays entering the crystal. The gamma ray detector 42 may be disposed at one end of the housing 40A. A radiation generator 44, for example, an electrically operated neutron generator such as a pulsed neutron generator, and a plurality of neutron detectors 45, 46, 47 may be disposed in the housing 40A at various positions longitudinally below the radiation generator 44. The neutron detectors 45, 46, 47 may be any combination of neutron detecting device known in the art used in well logging instrumentation, including, as non-limiting examples, lithium-6 scintillation detectors, helium-3 proportional counters and similar devices. The neutron detectors 45, 46, 47 may include suitable radiation shielding (not shown) according to the energy level of the neutrons to be detected (e.g., fast, epithermal and thermal), the lateral position of the detector in the housing 40A and the longitudinal placement of the detector with respect to the neutron generator 44. A neutron monitor detector 43 may also be disposed in the housing 40A proximate the radiation generator 44 to provide a signal related to the radiation output of the generator 44. Appropriate shielding 50 is also disposed within the housing 40A as shown in FIG. 1 to reduce detection of neutrons and/or gamma-radiation directly along the interior of the housing 40A, as is known in the art.

As used herein, the term "radiation generator" is intended to mean any electrically operated device that uses electrical power to controllably generate ionizing and/or nuclear radiation. A neutron generator, such as those identified in the Background section herein are examples of one type of radiation generator. Another type of radiation generator is an x-ray tube or generator. Used as such, the term "radiation generator" is intended to be distinguished from chemical isotope radiation sources, which produce ionizing and/or nuclear radiation by decay of atomic nuclei and which are not controllable by electrical means. In the examples shown herein the radiation generator may be a neutron generator, however it is to be clearly understood that the invention is applicable to other types of electrically operated radiation generators.

A high voltage power supply 52 is disposed at one end of the housing 40A and may be functionally coupled to the neutron generator 44 using a high voltage connection 54. The purpose of the high voltage power supply 52, among others, is to provide acceleration voltage to a target anode in the radiation generator 44 to facilitate the nuclear reaction that produces neutrons in a neutron generator, or to produce x-rays in an x-ray generator. As used herein, therefore, the term "high voltage" as applied to an electrical power supply is intended to mean that the output voltage of such power supply is within a range used to operate a radiation generator target anode. The length of the connection 54 and the corresponding longitudinal distance between the neutron generator 44 and the power supply 52 should be enough to enable placement of one or more radiation detectors between the generator 44 and the power supply 52.

By separating the high voltage power supply 52 longitudinally from the neutron generator 44, i.e., by using the high voltage connection 54, a smaller overall tool diameter and/or length is made possible, along with possible improved detector placement and improved shielding for the detectors 45, 46, 47 in cases where the detectors are best positioned proximate to the neutron generator 44. A well logging instrument according to the invention can be implemented using any one of a number of different devices for making the connection 54. For example, the connection 54 can include a small diameter tube made of a suitable material, for example, steel. The tube can be routed within the instrument housing 40A in a number of different ways. In one example, the tube is disposed within the housing 40A surrounded by a high voltage insulating gas (e.g., sulfur hexafluoride). Another example may be implemented with a high voltage electrical cable with suitable electrical connectors at the ends thereof. Quick-connect type couplings may be used to implement the connectors as known in the art. Another example can be implemented with an integrated connection between the generator 44 and the power supply 52 using materials known in the art, for example copper wire disposed in an insulating material such as ceramic, TEFLON polytetrafluoroethylene, FLUORINERT fluorocarbon-based fluid, sulfur hexafluoride or combinations of the foregoing. Still other examples may be implemented with connections having an inherent resistance. For example, a connection can be formed with a suitable high voltage cable having a predetermined electrical resistance. Such cable may be similar in configuration to an automotive spark plug cable. The resistance characteristics of such cable can be selected to provide an overall resistance sufficient to serve as a surge resistor and could combine the features of electrical conductivity and the need for a surge resistor in the high voltage circuit to the neutron generator. Yet another example may include a high voltage connector made by Spellman High Voltage Electronics Corporation, Valhalla, N.Y. Those skilled in the art will appreciate that other configurations of a high voltage connection allowing for placement of devices such as detectors between the power supply 52 and the neutron generator 44 may be used other examples.

Figure 3A:
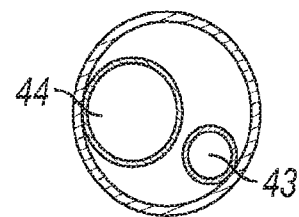
FIGS. 3A through 3D show cross sections of the instrument shown in FIG. 3 at selected longitudinal positions.
Figure 3B:
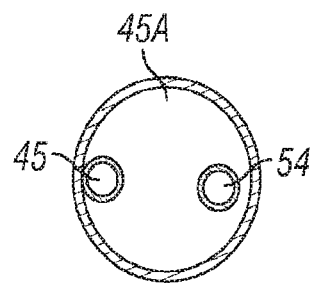
Figure 3C:
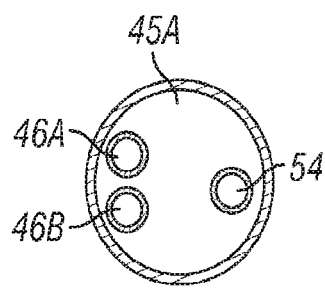
Figure 3D:
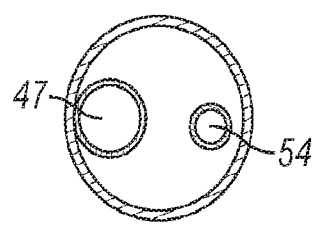

FIGS. 3A through 3D show cross sections of the instrument of FIG. 3 at various longitudinal positions along the instrument. FIG. 3A shows a cross section at the position of the neutron generator 44 and the monitor detector 43. FIG. 3B shows a cross section at the position of one of the neutron detectors 45. Part or all of the volume within the cross section of the housing 40A not occupied by the detector 45 and the connection 54 may be filled with one or more types of radiation shielding 45A. FIG. 3C shows a cross section at a position of other neutron detectors 46a, 46b. The detectors 46a, 46b in FIG. 3C correspond to the detector shown at 46 in FIG. 3 and are intended to exemplify an array of neutron detectors at a same longitudinal spacing from the neutron generator (44 in FIG. 3). Such arrays are known in the art. As in the cross section shown in FIG. 3B, the section shown in FIG. 3C may have all or part of the volume inside the housing 40A not occupied by the detectors 46a, 46b and the connection 54 include radiation shielding 45A. FIG. 3D shows a cross section of the instrument at the position of a neutron detector 47 that is farthest spaced from the pulsed neutron generator (44 in FIG. 3).

FIG. 4 shows another example of an instrument according to the invention. The instrument 60 may implemented with a large spectral gamma ray detector 62 disposed in the instrument housing 60A proximate to the high voltage connection 64. A plurality of neutron detectors 65, 66, 67, 68 may also be disposed within the instrument housing 60A at various longitudinal distances from a pulsed neutron generator 70. A neutron monitor detector 71 may also be disposed in the instrument in a manner similar to the previous example. Appropriate shielding 72 may also disposed within the instrument housing 60A to reduce detection of directly propagated neutrons and/or gamma-radiation as known in the art. Various examples may also be implemented with additional detectors, such as a gamma-ray detector 73 disposed at one longitudinal end of the instrument 60. For clarity of the illustration, the high voltage power supply is not shown in FIG. 4. It will be understood that the voltage connection 64 extends into the lower portion of the tool to couple with the voltage supply. Though not to be limited to any particular conveyance techniques, the instrument configurations shown in FIGS. 3 and 4 are suitable for housings designed for wireline conveyance.

FIG. 4E shows a cross section of the instrument of FIG. 4 at a longitudinal position of two of the neutron detectors 66, 67. FIG. 4F shows a cross section of the instrument of FIG. 4 at the longitudinal position of the neutron generator 70 and monitor detector 71.

Figure 5:
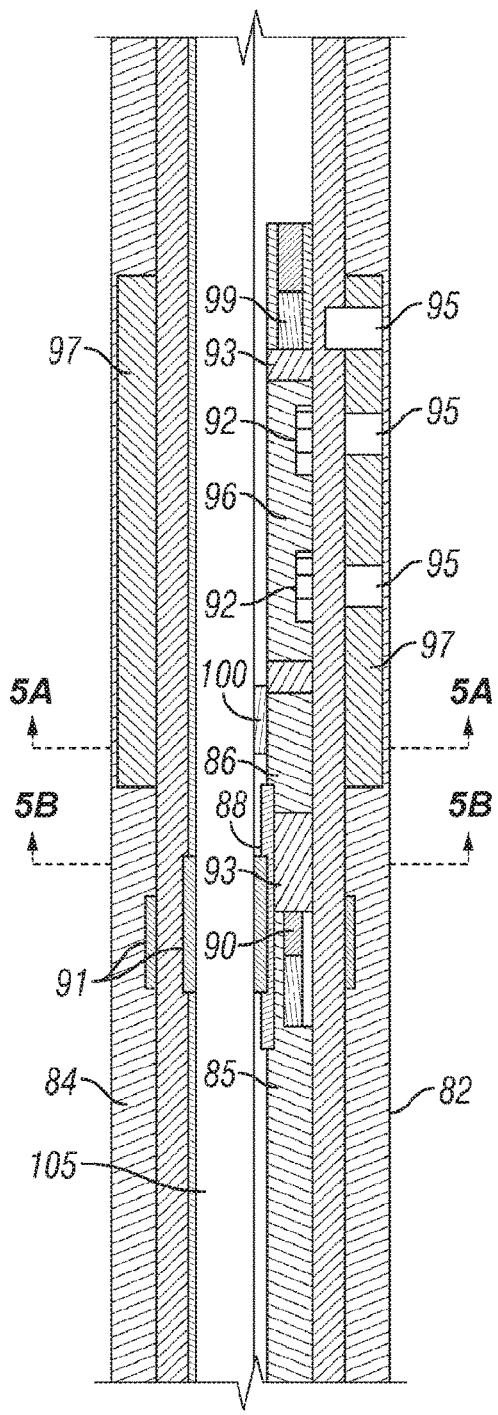
FIG. 5 shows another example of an instrument according to the invention.

FIG. 5 shows another example of an instrument according to the invention. This example may more suitable for while-drilling conveyance than the previous examples, although the example of FIG. 5 is not limited to such conveyance. A drill collar 80 is disposed in a borehole 82 drilled through subsurface rock formations. The borehole 82 contains drilling fluid 84 ("mud"). The drill collar 80 includes a high voltage power supply 85 functionally coupled to a pulsed neutron generator 86 using a high voltage connection 88. A gamma ray spectroscopy detector 90 may be disposed proximate the high voltage connection 88 and proximate the high voltage power supply 85. The drill collar 80 may include wear bands having boron shielding 91 to provide shielding and added protection as known in the art. In one example, neutron detectors 92 may be disposed within the collar 80 and positioned substantially in alignment with radiation transparent windows 95 formed in a stabilizer blade 97. The stabilizer may be affixed to or mounted on the collar 80. Appropriate radiation shielding 93 is also disposed within the collar 80. The neutron detectors 92 may be disposed and surrounded by a boron loaded, rubber/epoxy layer 96. One example of the instrument can be implemented with a deep-reading density detector 99 and a corresponding radiation transparent window 95 formed in the stabilizer blade 97. A neutron monitor detector 100 can also be disposed within the collar 80 proximate the neutron generator 86 and used as explained with reference to the previous examples. The space reduction provided by longitudinally separating the voltage supply 85 from the neutron generator 86 using the high voltage connection 88 enables the collar 80 to have a larger internal flow channel 105 than was possible using configurations known in the art prior to the present invention. As known in the art, the flow channel 105 is provided within the collar 80 and implemented with pressure barrier means (e.g., via a stand-alone hole formed in the collar, a separate pipe or conduit disposed in the collar).

Figure 5A:
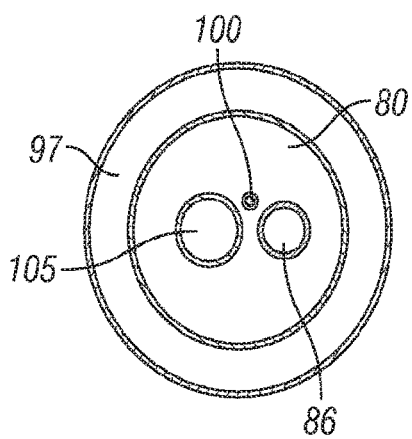
FIGS. 5A and 5B show cross sections of the instrument of FIG. 5.
Figure 5B:
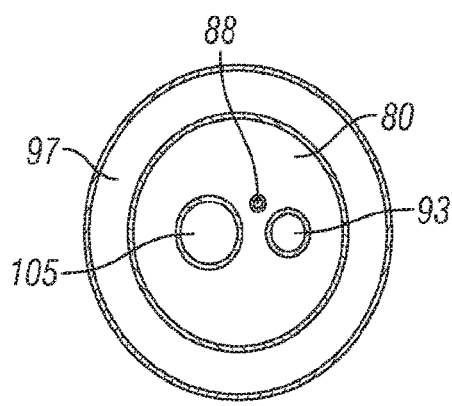

Cross sections of the foregoing instrument are shown in FIGS. 5A and 5B to illustrate the relative lateral positioning of certain components, including the monitor detector 100 and the shielding 93.

Figure 6:
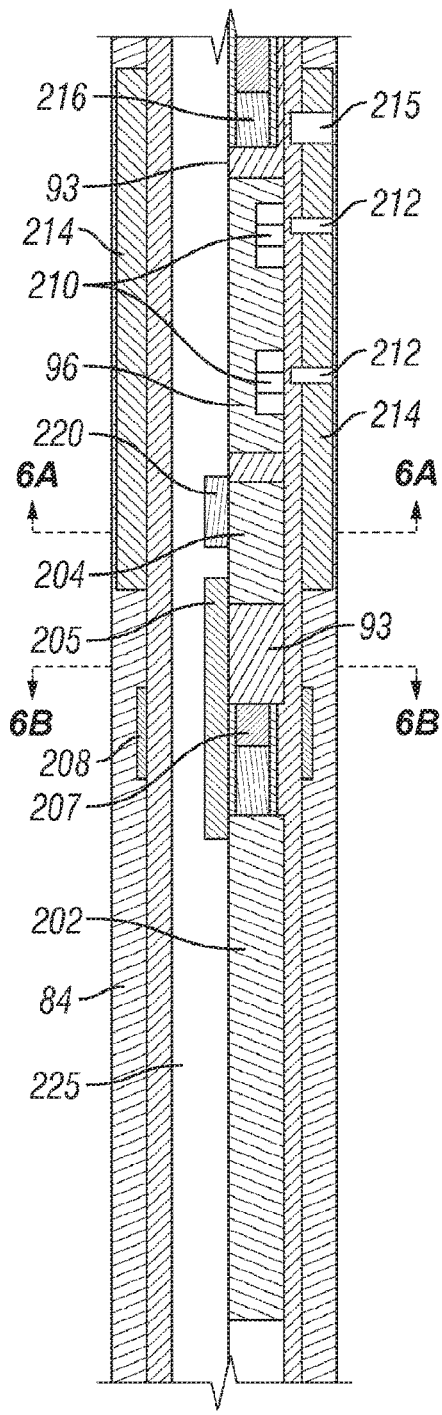
FIG. 6 shows another example of an instrument according to the invention.

FIG. 6 shows another aspect of the invention. This aspect is also more suitable for while-drilling applications. A drill collar 200 is disposed in a borehole 82 containing drilling fluid 84. The drill collar 200 is equipped with a voltage supply 202 linked to the neutron generator 204 via a voltage connection 205. A spectroscopy detector 207 is disposed by the voltage connection 205 and near the voltage supply 202. The collar 200 is also fitted with a wear band/boron shield 208 to provide shielding and added protection as known in the art. In one aspect, neutron detectors 210 may be disposed within the collar 200 and positioned in alignment with radiation transparent windows 212 formed in a stabilizer blade 214 on the collar. Appropriate shielding 93 is also disposed within the tool. The neutron detectors 210 may be supported and sealed within a rubber/epoxy layer 96. One aspect can be implemented with a deep density detector 216 and an optional corresponding radiation transparent window 215 formed in the stabilizer blade 214. A neutron monitor 220 can also be disposed within the collar 200. Again, the space reduction provided by separating the voltage supply 202 from the neutron generator 204 with a reduced diameter voltage connection 205 allows the collar 200 to have an adequate internal flow channel 225. The configuration of FIG. 6 provides a smaller overall diameter tool compared to the tool configuration of FIG. 5.

Figure 6A:
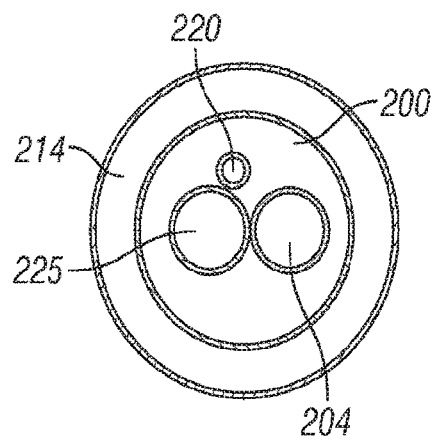
FIGS. 6A and 6B show cross sections of the instrument of FIG. 6.
Figure 6B:
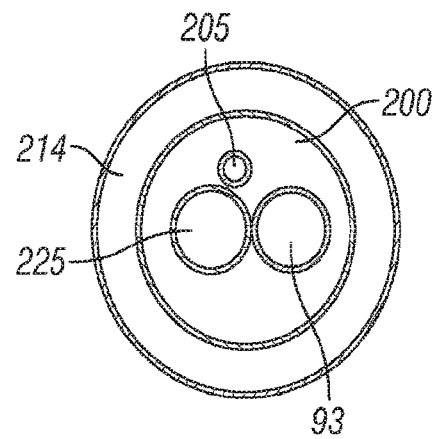

Cross sections of the foregoing instrument are shown in FIGS. 6A and 6B to illustrate the relative lateral positioning of certain components.

It will be appreciated by those skilled in the art that various logging instrument configurations can be implemented using the longitudinally separated voltage connection techniques disclosed herein. Optimum instrument configuration in any particular example will depend on the detector types to be used. It will also be appreciated that the disclosed instrument configurations can be implemented with various additional types of sources and sensors to perform a variety of subsurface measurements other than nuclear-type measurements as is known in the art. Though not shown for clarity of illustration, the disclosed examples can be implemented with conventional electronics, sources, sensors, hardware, circuitry, housings and materials as known in the art. Certain examples can be implemented using shielding materials comprising tungsten or any other elements or compounds as known in the art. Radiation transparent windows can be implemented using materials comprising titanium, zirconium and other materials known in the art for such purposes. The neutron detectors may also comprise conventional thermal and/or epithermal neutron detectors as are known in the art. The disclosed examples also work independently of the conveyance method. Systems implemented with the disclosed configurations may be conveyed along a borehole by without limitation, armored electrical cable ("wireline"), smooth surface wire ("slickline"), using threadedly coupled pipe or tubing ("logging while drilling", "logging while tripping"), or by coiled tubing. Various examples may be permanently emplaced in a wellbore for reservoir monitoring.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A well logging instrument, comprising:
at least one of an ionizing and nuclear radiation generator;
a high voltage power supply functionally coupled to the radiation generator, the generator being separated from the power supply; and
an electrical connection between the power supply and the generator;
wherein the generator and the power supply each extend in a direction corresponding to the longitudinal direction of the instrument, wherein the power supply and the generator are radially offset relative to each other.

2. The instrument of claim 1 further comprising at least a first radiation detector and wherein at least one of the connection and the power supply is positioned in a same radial plane of the instrument as the first radiation detector.

3. The instrument according to claim 2, wherein the at least first radiation detector comprises a neutron detector.

4. The instrument according to claim 2, wherein the at least first radiation detector comprises a spectral gamma ray detector.

5. The instrument according to claim 2, wherein the generator, the at least first detector and the connection are disposed in a housing configured to move along a borehole drilled through subsurface formations.

6. The instrument of claim 5, wherein the housing is configured to be conveyed along the borehole by at least one of wireline, slickline, threadedly coupled tubing and coiled tubing.

7. The instrument according to claim 2, wherein the first radiation detector and the generator overlap when projected in a radial plane of the instrument.

8. The instrument according to claim 2, wherein the generator contacts a wall of the instrument in a predetermined radial location when projected in the radial plane and the first radiation detector contacts the wall in the predetermined radial location as well.

9. The instrument according to claim 1, wherein the electrical connection comprises a conductive material surrounded by an electrically insulating gas or and electrically insulating liquid.

10. The instrument according to claim 1, wherein the radiation generator comprises a neutron generator.

11. The instrument according to claim 1, wherein the generator and the power supply are positioned in the instrument so that they do not overlap when projected on a radial plane of the instrument.

12. The instrument according to claim 1, wherein the generator contacts a wall of the instrument in a predetermined radial location when projected in a radial plane of the instrument, wherein the power supply contacts the wall of the instrument at a substantially opposite radial location when projected in the radial plane.

13. A method for evaluating formations traversed by a borehole, comprising:
   generating electrical power to operate at least one of a nuclear and an ionizing radiation generator at a position separated from a position of the radiation generator along the borehole,
   conducting the electrical power to the radiation generator via an electrical connection comprising a conductive material surrounded by an electrically insulating gas or and electrically insulating liquid;
   operating the generator to emit high ionizing radiation into the formations; and
   detecting radiation with at least one radiation detector.

14. The method of claim 13 wherein the detecting radiation comprises detecting neutrons.

15. The method of claim 14, wherein the neutrons comprise at least one of high energy neutrons, thermal neutrons and epithermal neutrons.

16. The method of claim 13, wherein the detecting radiation comprises detecting gamma rays.

17. The method of claim 16, further comprising spectrally analyzing the detected gamma rays.

18. The method of claim 13, further comprising detecting radiation at at least one position not between the position of the generating power and the radiation generator.

19. The method of claim 18, wherein the detecting radiation at at least one position comprises detecting gamma rays or neutrons.

20. A well logging instrument, comprising:
   at least one of an ionizing and nuclear radiation generator;
   a high voltage power supply functionally coupled to the radiation generator, the generator being separated from the power supply;
   an electrical connection between the power supply and the generator; and
   at least a first radiation detector and wherein at least one of the connection and the power supply is positioned in a same radial plane of the instrument as the first radiation detector, and wherein the first radiation detector and the generator overlap when projected in a radial plane of the instrument.

* * * * *